Oct. 15, 1935.         R. A. THOMAS              2,017,222
                        BERRY BOX
                    Filed Nov. 14, 1934
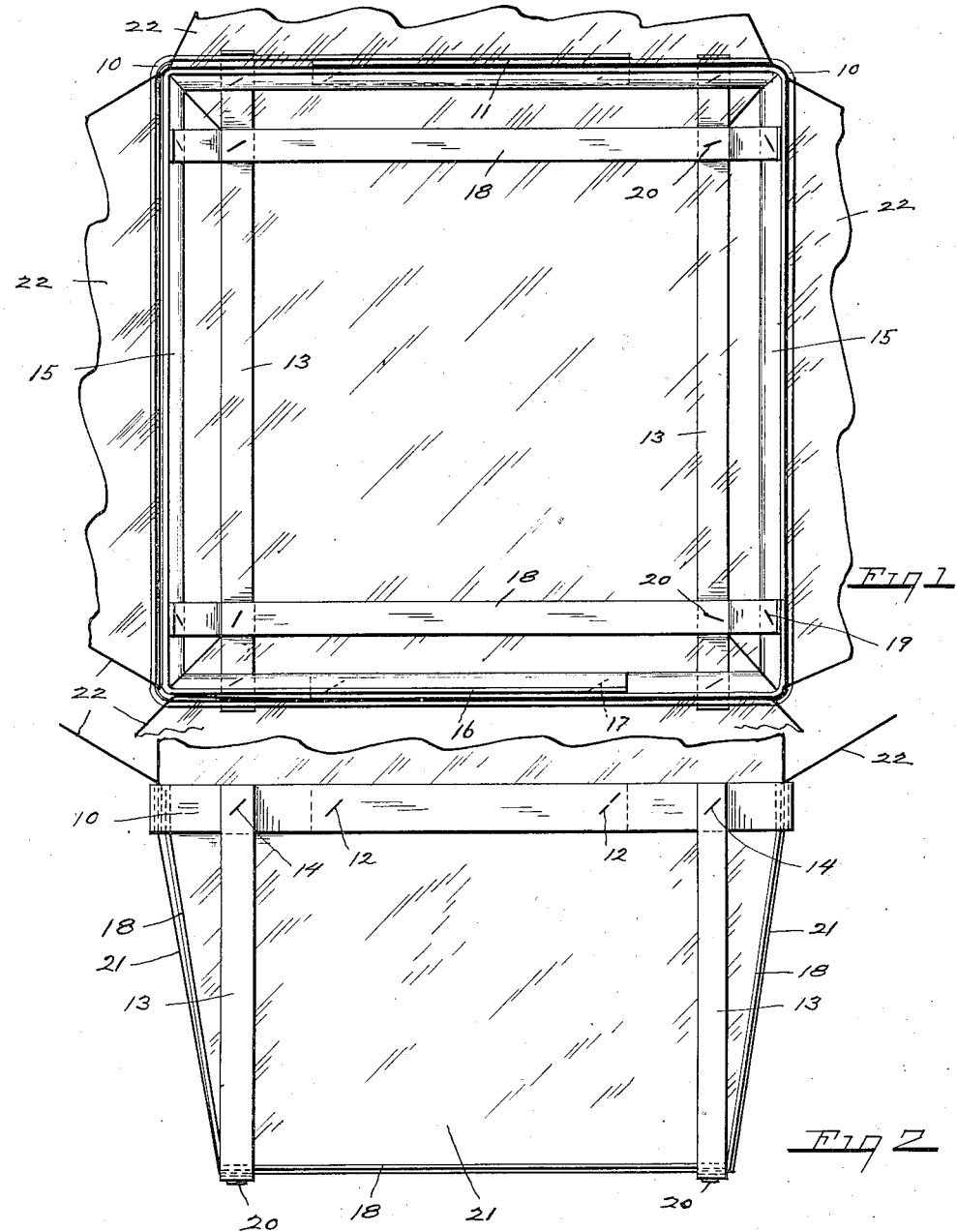
Inventor
Robert A. Thomas
By
                Attorney Patented Oct. 15, 1935

2,017,222

UNITED STATES PATENT OFFICE 2,017,222

BERRY BOX

Robert A. Thomas, Hollowville, N. Y., assignor of one-half to Horton Gardner, Claverack, N. Y.

Application November 14, 1934, Serial No. 752,903

1 Claim. (Cl. 206—44)

This invention relates to a berry box or container for fruit, berries and the like and more particularly to a box in which the sides and bottom are constructed from a transparent material through which the contents may be seen and inspected from all sides without shaking up or disturbing the fruit.

In the marketing of berries and fruit it is sometimes the custom to pack the choice berries on the top of the container and the purchaser has the habit of grasping the berry box in the hands and shaking up the contents to examine the berries at or near the bottom and in this manner the fruit is damaged.

The object of the invention is to provide a berry box or container having sides and bottom constructed of transparent material such as "Cellophane" through which the contents may be inspected.

Another object of the invention is to provide a container of this kind which may be formed with extended sides that can be folded together over the top of the contents and sealed to provide a sanitary package.

Another object of the invention is to provide a container that shall be durable, efficient and low in cost, and in which if desired, the transparent container may be renewed.

With these and other objects in view, my invention consists in certain novel construction and combination of parts as will hereinafter be fully described and claimed, and further illustrated in the accompanying drawing which forms a part hereof and in which like figures of reference refer to corresponding parts in all of the views, and it is understood that slight changes may be made without departing from the spirit of the invention.

In the drawing:

Figure 1 is a top plan view of a berry box constructed in accordance with my invention, and showing the same with the flaps of the side extensions in an open position.

Figure 2 is a side elevation of the same.

Referring to the drawing:

The article comprises a rectangular outer frame 10 having its ends overlapped as at 11 and an inner frame 15 having its ends overlapped as at 16, and designed to fit within the outer frame 10, and it is to be understood that while I have shown these frames as being of the usual size and shape that is used for berries, that they may be of any desired size and shape desired.

The outer frame 10 is provided with the two depending U-shaped supporting members 13 which have their ends attached to the frame 10 by the staples 14.

The inner frame 15 is also provided with a similar pair of supporting members 18 which have their ends attached to the frame 15 by the staples 19.

This inner frame 15 with its depending supporting members 18 is placed within the outer frame 10 and in registry therewith, but with its depending supporting members 18 at right angles to the supporting members 13, and where the members 13 cross the members 18 they are secured together in a nested position by the staples 20, thus providing an inner and an outer framework.

Between these two frames is placed a sheet of transparent material such as "Cellophane" 21, which may be folded upon two or more sides to form a box, or which may be molded to form a box, and this box is retained between the inner and outer frames and supporting members by the staples 12, 17, 19, and 20 which hold the frames together, thus providing a protecting frame both inside and outside of the transparent box, to prevent damage thereto by the contents pressing outward and the fingers of the handler pressing inward.

This transparent box 21 may have its upper edges extended to form flaps 22, which may be folded down together upon the contents and sealed together to form a tight and sanitary package.

Should it be desired to make the article with a renewable transparent box, the completed inner and outer frames may have the box inserted within the inner frame and not between the frames, and in this manner it may be removed and another inserted in its place.

Printing and advertising matter to describe the contents may be placed upon the transparent box or flaps.

While I have shown the frames as being constructed of wood, they may be of any suitable material and in place of the staples, other means of securing the parts together may be employed.

Having thus described my invention, what I claim as new and desire to secure by Letters Patent, is:

In a container for berries and the like, an outer frame having depending supporting members adjacent the corners thereof, an inner frame having depending supporting members adjacent the corners thereof, the inner frame designed to be placed within the outer frame with its supporting members crossed with the supporting members of the outer frame, a transparent box-shaped lining placed between the inner and the outer frames, securing means passed through both the inner and outer frames and through said box, and flaps formed on the upper sides of said box and adapted to be folded down upon the contents of the container.

ROBERT A. THOMAS.